(12) United States Patent
Cho

(10) Patent No.: US 8,131,227 B2
(45) Date of Patent: Mar. 6, 2012

(54) METHOD OF TRANSCEIVING DRIVER SOFTWARE OVER THE AIR AND APPARATUS USING THE SAME

(75) Inventor: Eun Hyung Cho, Gumi-si (KR)

(73) Assignee: LG Electronics Inc., Seoul (KR)

( * ) Notice: Subject to any disclaimer, the term of this patent is extended or adjusted under 35 U.S.C. 154(b) by 559 days.

(21) Appl. No.: 11/649,167

(22) Filed: Jan. 4, 2007

(65) Prior Publication Data

US 2008/0016241 A1 Jan. 17, 2008

(30) Foreign Application Priority Data

Jul. 14, 2006 (KR) .......................... 10-2006-0066486

(51) Int. Cl.
*H03C 7/02* (2006.01)
(52) U.S. Cl. ...... 455/101; 455/91; 455/414.2; 455/414.4
(58) Field of Classification Search .................. 455/450, 455/451, 452, 453, 445, 509, 516, 517, 91, 455/101, 414.2, 414.4; 370/320, 328, 338, 370/390, 395.52
See application file for complete search history.

(56) References Cited

U.S. PATENT DOCUMENTS

| 3,842,352 | A | * | 10/1974 | Cote | 455/504 |
| 5,029,185 | A | * | 7/1991 | Wei | 375/245 |
| 5,056,112 | A | * | 10/1991 | Wei | 375/280 |
| 5,301,209 | A | * | 4/1994 | Wei | 375/265 |
| 5,446,759 | A | * | 8/1995 | Campana, Jr. | 375/267 |
| 5,844,907 | A | * | 12/1998 | Uchiki et al. | 370/517 |
| 5,999,815 | A | * | 12/1999 | TenBrook et al. | 455/436 |
| 6,088,337 | A | * | 7/2000 | Eastmond et al. | 370/280 |
| 6,198,980 | B1 | * | 3/2001 | Costanza | 700/99 |
| 6,247,158 | B1 | * | 6/2001 | Smallcomb | 714/786 |
| 6,484,284 | B2 | * | 11/2002 | Smallcomb | 714/786 |
| 6,516,037 | B1 | * | 2/2003 | Wei | 375/264 |

(Continued)

FOREIGN PATENT DOCUMENTS

EP 1 703 732 9/2006

(Continued)

OTHER PUBLICATIONS

European Search Report dated Feb. 12, 2010 for Application No. 07 250 079.6.

(Continued)

*Primary Examiner* — Kent Chang
*Assistant Examiner* — Ronald Eisner
(74) *Attorney, Agent, or Firm* — KED & Associates, LLP

(57) ABSTRACT

A method and apparatus may be provided for over-the-air transmission of driver software configured as a plurality of download data blocks (DDBs). This may include transmitting or receiving first DDB data corresponding to the plurality of download data blocks, where each download data block of the first DDB data has a first packet identifier value and each of the plurality of download data blocks of the first DDB data may have the same first packet identifier. Second DDB data corresponding to the plurality of download data blocks may also be transmitted or received, where each download data block of the second DDB data has a second packet identifier value and each of the plurality of download data blocks of the first DDB data may have the same second packet identifier. The transmission of the second DDB data may exhibit a temporal overlap with respect to the transmission of the first DDB data.

18 Claims, 4 Drawing Sheets

U.S. PATENT DOCUMENTS

| | | | |
|---|---|---|---|
| 6,678,267 B1 * | 1/2004 | Anandakumar et al. | 370/356 |
| 7,391,320 B1 * | 6/2008 | Beard et al. | 340/539.1 |
| 7,397,864 B2 * | 7/2008 | Tarokh et al. | 375/299 |
| 7,551,681 B2 * | 6/2009 | Chan et al. | 375/267 |
| 7,555,031 B2 * | 6/2009 | Chan et al. | 375/136 |
| 7,751,305 B2 * | 7/2010 | Jung et al. | 370/203 |
| 2001/0034872 A1 * | 10/2001 | Smallcomb | 714/786 |
| 2001/0038642 A1 * | 11/2001 | Alvarez et al. | 370/477 |
| 2002/0001458 A1 * | 1/2002 | Abelard et al. | 386/111 |
| 2002/0129107 A1 * | 9/2002 | Loughran et al. | 709/206 |
| 2003/0138237 A1 | 7/2003 | Stewart | 386/92 |
| 2004/0068721 A1 * | 4/2004 | O'Neill et al. | 717/168 |
| 2004/0158868 A1 | 8/2004 | Korst | 725/101 |
| 2005/0152475 A1 * | 7/2005 | Lakkis | 375/316 |
| 2005/0254428 A1 * | 11/2005 | Perkins et al. | 370/235 |
| 2006/0052067 A1 | 3/2006 | Singh et al. | |
| 2006/0209780 A1 * | 9/2006 | Nikula et al. | 370/347 |
| 2006/0268918 A1 | 11/2006 | Olexa et al. | |
| 2007/0074266 A1 * | 3/2007 | Raveendran et al. | 725/135 |
| 2007/0081588 A1 * | 4/2007 | Raveendran et al. | 375/240.1 |
| 2007/0103592 A1 * | 5/2007 | Shih | 348/554 |
| 2007/0104285 A1 * | 5/2007 | Chan et al. | 375/267 |
| 2007/0189242 A1 * | 8/2007 | Hosokawa et al. | 370/338 |

FOREIGN PATENT DOCUMENTS

| | | |
|---|---|---|
| KR | 10-2005-0106270 | 11/2005 |
| KR | 10-2006-0133709 | 12/2006 |
| KR | 10-2007-0021544 | 2/2007 |
| WO | WO 00/69141 A2 | 11/2000 |

OTHER PUBLICATIONS

Korean Notice of Allowance dated Apr. 10, 2008.

* cited by examiner

METHOD OF TRANSCEIVING DRIVER SOFTWARE OVER THE AIR AND APPARATUS USING THE SAME

This application claims the benefit of Korean Patent Application No. 10-2006-0066486, filed on Jul. 14, 2006, which is hereby incorporated by reference as if fully set forth herein.

BACKGROUND OF THE INVENTION

1. Field of the Invention

The present invention relates to a mobile receiver including digital televisions and other mobile devices, such as personal digital assistants (PDAs) and cellular telephones provided with image displays, which require driver software that may be downloaded over the air from a broadcasting station, and more particularly, relates to a method of transceiving driver software and an apparatus, such as a digital television, using the same.

2. Discussion of the Related Art

A digital television is a kind of mobile receiver that is generally provided with driver software installed at the time of sale to enable control of a user interface with the digital television and to provide the user with means for operating the television's various features. Besides digital televisions, other mobile receivers, for example, a PDA or mobile phone, also utilize driver software requiring a regiment of updating that continues over the life of the device, that is, after the time of sale. Driver software is essentially a program directly or indirectly associated with the driving of the apparatus in which it is installed.

After installation, driver software may be updated during an on-site visit by a service technician, or the updating may be performed by the user downloading the appropriate software from a manufacturer's website. To facilitate repeated and frequent updates, however, the driver software may be downloaded automatically, i.e., by the mobile receiver itself. Automatic updates of driver software may be enabled by a broadcasting station, which may embed the software in a stream of transport packets forming the broadcast signal or service, thereby transmitting the software over the air.

To facilitate over-the-air downloading, the broadcaster typically divides the software into a plurality of download data blocks (DDBs) to be transmitted together with a number of other broadcast signals, such as a video signal stream, various audio signal streams, additional data streams, or other software that may be associated with a television system. To enable the receiver side to identify specific software for downloading, the broadcaster assigns a specific packet identifier (PID) value to each packet of every download data block configuring the specific software to be downloaded. Thus, the software, which is identified as "software A" in FIG. 1, may be carried on one transport packet (TP) stream broadcast commonly to multiple users, i.e., digital broadcast receivers.

Referring to FIG. 1, the PID value of software A is set to, for example, "1," for each of five download data blocks. That is, on the transmitter side, the data of software A is divided into a series of download data blocks, for example, five, which may be expressed as DDB 1-1, DDB 1-2, DDB 1-3, DDB 1-4, and DDB 1-5, and the transmission repeats this sequence of download data blocks as necessary. Thus, a single transmission of software A consists of multiple download data blocks interspersed in the broadcaster's TP stream, which typically includes repeated instances of the same series of download data blocks.

Then, the receiver side, e.g., a television, selectively receives (according to PID value) the DDB data having a predetermined PID value indicating software to be downloaded, performs error checking on the received data to correct errors as necessary, and stores the error-checked data. Considering television driver software divided as in FIG. 1, this reception operation may take as long as ten minutes to complete one cycle. After reception, however, there may be a detection of an uncorrectable error in any one of the transmitted download data blocks, such that the DDB data is only partially received. That is, there may be an unreceived download data block, in which case the above reception operation must be performed anew (reinitiated) using a subsequent transmission of the same DDB data having the specific PID value, such that download speed suffers considerably.

SUMMARY OF THE INVENTION

Accordingly, the present invention is directed to a driver software transceiving method and a mobile receiver using the same that substantially obviate one or more problems due to limitations and disadvantages of the related art.

An object of the present invention is to provide a method of transceiving driver software and a mobile receiver using the same, which minimizes the time for downloading driver software.

Another object of the present invention is to provide a method of transceiving driver software and a mobile receiver using the same, which prevents unnecessary delays in downloading driver software due to errors present in the decoded data at the receiver side.

Another object of the present invention is to provide a method of transceiving driver software and a mobile receiver using the same, which facilitates over-the-air downloading of data, e.g., driver software, divided into a plurality of download data blocks (DDBs) at the transmitter side.

Another object of the present invention is to provide a method of transceiving driver software and a mobile receiver using the same, which achieves timely downloads of driver software despite failures in receiving one or more download data blocks.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages in accordance with the purpose of the invention, as embodied and broadly described herein, there is provided a method of over-the-air transmission of driver software configured as a plurality of download data blocks (DDBs). The method comprises transmitting first DDB data corresponding to the plurality of download data blocks, each download data block of the first DDB data having a first packet identifier value; and transmitting second DDB data corresponding to the plurality of download data blocks, each download data block of the second DDB data having a second packet identifier value, the transmission of the second DDB data exhibiting a temporal overlap with respect to the transmission of the first DDB data. The temporal overlap may be defined as a time delay measured with respect to the first transmission, wherein the time-delayed transmission occurs after transmission of a first download data block of the first transmission and before a final download data block of the first transmission.

In another embodiment of the present invention, there may be at least one step of transmitting further DDB data corresponding to the plurality of download data blocks, each download data block of the further DDB data having a specific packet identifier value. As in the case of just two separate transmissions, any further transmission of DDB data also exhibits a temporal overlap with respect to the transmission of the first DDB data.

Accordingly, on the receiver side, the method according to the present invention comprises receiving first DDB data corresponding to the plurality of download data blocks, each download data block of the first DDB data having a first packet identifier value; determining, based on the received first DDB data, whether an unreceived block of DDB data exists; searching, if it is determined that an unreceived block of DDB data exists, a plurality of packet identifier values for the packet identifier values carrying second DDB data corresponding to the plurality of download data blocks; reading, among the searched packet identifier values, the packet identifier value enabling the unreceived block of DDB data to be most preferentially received; and receiving the DDB data of the unreceived block among the DDB data having the read packet identifier value.

According to another aspect of the present invention, there is provided a broadcasting system comprising a transmitter for transmitting DDB data in accordance with the above method. Accordingly, on the receiver side, the present invention comprises a mobile receiver for receiving first DDB data corresponding to the plurality of download data blocks, each download data block of the first DDB data having a first packet identifier value; and a system controller for determining, based on the received first DDB data, whether an unreceived block of DDB data exists and, if it is determined that an unreceived block of DDB data exists, for searching a plurality of packet identifier values for the packet identifier values carrying second DDB data corresponding to the plurality of download data blocks, wherein the system controller reads, among the searched packet identifier values, the packet identifier value enabling the unreceived block of DDB data to be most preferentially received, so that the mobile receiver may receive the DDB data of the unreceived block among the DDB data having the read packet identifier value.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
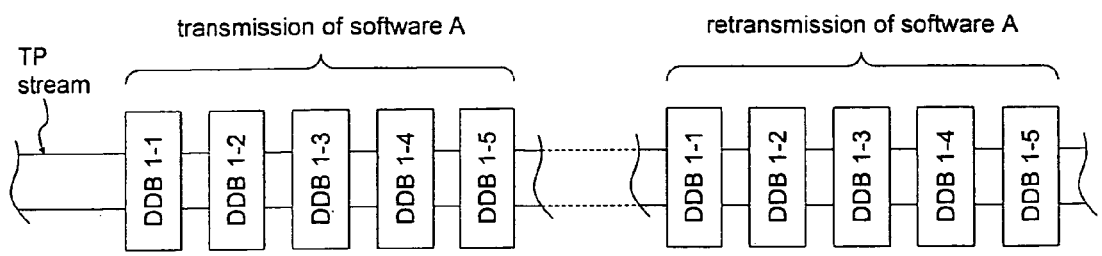
FIG. 1 is a diagram illustrating a contemporary method of dividing and transmitting driver software.

Reference will now be made in detail to exemplary embodiments of the present invention, examples of which are illustrated in the accompanying drawings. Wherever possible, like reference designations will be used throughout the drawings to refer to the same or similar parts.

A digital broadcasting system adopting the method of the present invention divides driver software to be transmitted to a mobile receiver using the software, which is identified according to packet identifiers included in the transport stream. The packet identifier value may be set to one of a predetermined set of values to identify the packets making up a download data block of the driver software. Therefore, using a specific packet identifier value, e.g., "1," "2," or "3" (i.e., PID=1, 2, 3), software A may be imbedded in service data provided by the broadcaster and received by a digital television receiver adopting the method of the present invention. Herein, software A indicates a specific software, which may be an application associated with system operation, on-screen display functions, user interfacing, and other display-based operations for a device having image display capability, such as a digital television, mobile telephone, or personal digital assistant. Software A may also include firmware.

Accordingly, on the transmitter side, the data of software A is divided into series of download data blocks, namely, download data blocks DDB 1-1 through DDB 1-N. The data structure (formatting) of each download data block is defined according to OTA specifications. For reference, the format for download data messages is shown in Table 1A, which includes fields for a payload (dataMessagePayload) of at least one download data block.

TABLE 1A

| Syntax | No. of Bits | Format |
| --- | --- | --- |
| downloadDataMessage( ) {  dsmccDownloadDataHeader( )  dataMessagePayload( ) } | | |

Meanwhile, the dataMessagePayload format is shown in Table 1B.

TABLE 1B

| Syntax | No. of Bits | Format |
| --- | --- | --- |
| downloadDataBlock( ) {  dsmccDownloadDataHeader( ) | | |
| moduleId | 16 | uimsbf |
| moduleVerison | 8 | uimsbf |
| reserved | 8 | '11111111' |
| blockNumber | 16 | uimsbf |
| for(i=0; i<N; i++) { | | |
| blockDataByte | 8 | bslbf |
| } } | | |

Thus, it should be noted that the payload of each data message downloaded includes a field, i.e., "blockNumber," for discriminating each data block.

According to the present invention, software A is transmitted using a packet identifier (PID) value set to, say, "1," i.e., a first value. Then, software A is additionally transmitted at least once using a second PID value, for example, "2."

According to the principles of the present invention, software A may further be transmitted using a third PID value, for example, "3," and may further be transmitted using additional PID values (PID=M). In each instance, there is an increasing time delay with respect to the first transmission, where the delay is measured with respect to the first transmission and is greater than the length of the first download data block, e.g., DDB 1-1, but less than a time delay until the final download data block, e.g., DDB 1-N, is transmitted. That is, since the download data blocks are all included in the same TP stream and since each of the download data blocks is an integral unit, a subsequent transmission of the DDB data of software A cannot occur until transmission of DDB 1-1 is completed. Meanwhile, in order to secure the benefit of the present invention, namely, to reduce download (decoded data reception) time, the subsequent transmission of the DDB data of software A must begin before transmission of DDB 1-N is initiated.

In other words, a broadcasting station adopting the present invention may transmit the same software using two different packet identifier values according to one embodiment (e.g., DDBs 1-1~1-N and DDBs 2-1~2-N; PID=1, 2) and may transmit the same software using three or more different packet identifier values according to another embodiment (e.g., DDBs 1-1~1-N, DDBs 2-1~2-N, and DDBs 3-1~3-N; PID=1, 2, 3). In each embodiment, however, the additional transmission or transmissions exhibit a temporal overlap, in part, with respect to all earlier transmissions and particularly with respect to the first transmission.

According to the present invention, in transmitting driver software that has been divided into five download data blocks (N=5), the data of download data blocks DDBs 2-1, 2-2, 2-3, 2-4, and 2-5 (PID=2) corresponds directly to the data of download data blocks DDBs 1-1, 1-2, 1-3, 1-4, and 1-5, respectively. Likewise, the data of download data blocks DDBs 3-1, 3-2, 3-3, 3-4, and 3-5 (PID=3) corresponds directly to the data of download data blocks DDBs 1-1, 1-2, 1-3, 1-4, and 1-5, respectively, and the data of download data blocks DDBs M-1, M-2, M-3, M-4, and M-5 (PID=M) corresponds directly to the data of download data blocks DDBs 1-1, 1-2, 1-3, 1-4, and 1-5, respectively. In other words, the present invention is characterized in that DDB data differing in packet identifier values is transmitted in transmitting the same, i.e., corresponding, download data block.

Accordingly, with software A divided and transmitted from a broadcasting station as described above, a mobile receiver (e.g., a digital television or the like) receives DDB data of PID=1 while checking for the DDB data of an unreceived block (an unsuccessfully decoded block), which is identifiable by block number as in Table 1B. For instance, if during the first transmission (PID=1) of software A, the DDB data of a specific download data block, say, DDB 1-4 (blockNumber=4), is not received, reception of software A may be completed by receiving only the corresponding DDB data of PID=2, namely, the data of DDB 2-4. Thereafter, for example, after recovering reception of the unreceived DDB data (DDB 1-4), the mobile proceeds in its selective reception of software A having the first packet identifier value (e.g., PID=1). That is, according to the present invention, after receiving DDB data of a first packet identifier value, if the receiver is unable to receive DDB data of one or more blocks according to a block number checking operation, the receiver searches for a packet identifier value enabling its corresponding data to be received most quickly. This is in contrast to conventional methods in which driver software is transmitted using a single packet identifier value, as in FIG. 1, where all of the transmitted DDB data (e.g., DDBs 1-1, 1-2, 1-3, 1-4, and 1-5) would be subsequently and sequentially received to realize a completed reception of the initially unreceived DDB data.

Figure 2:
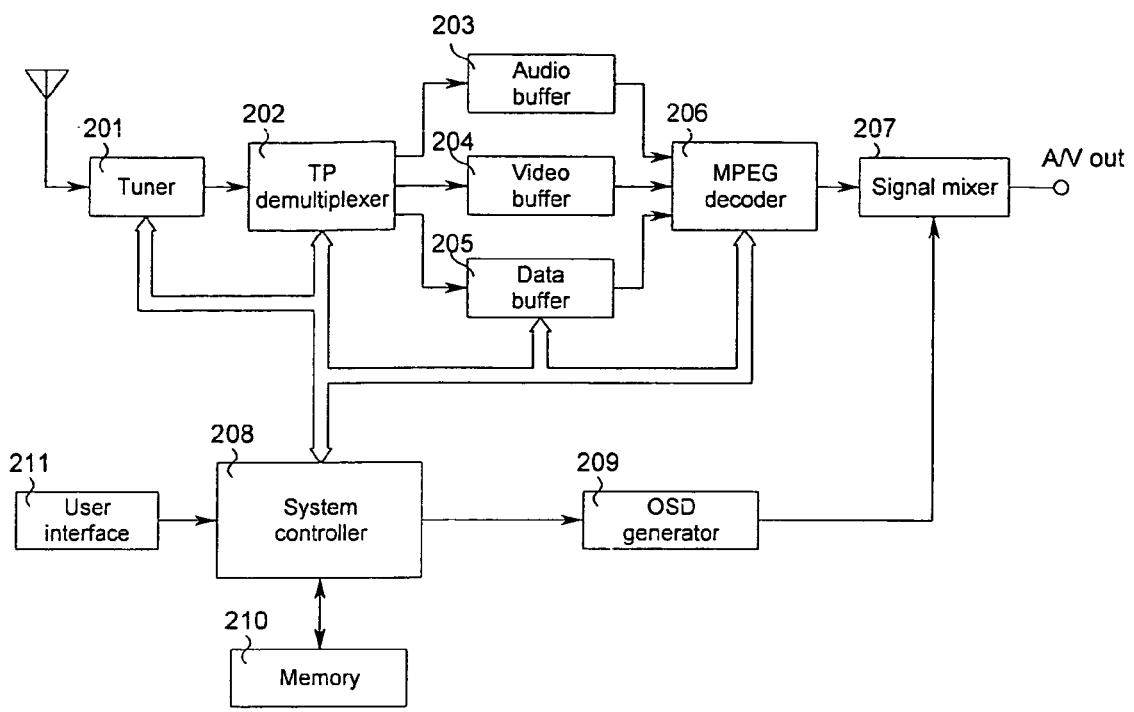
FIG. 2 is a block diagram of a mobile receiver according to the present invention.

Referring to FIG. 2, a broadcast receiver according to the present invention enables faster downloading of software, which has been divided and transmitted according to the principles of the present invention, by checking information included in the download, namely, block numbers and packet identifiers. The broadcast receiver includes a tuner 201, a transport packet (TP) demultiplexer 202, an audio buffer 203, a video buffer 204, a data buffer 205, a Motion Pictures Experts Group (MPEG) decoder 206, a signal mixer 207, a system controller 208, an on-screen display (OSD) generator 209, a memory 210, and a user interface 211. The broadcast receiver according to the present invention may be a digital television or other mobile receiver.

The tuner 201, which may include a plurality of tuners, receives a digital broadcast channel including an MPEG transport stream received via services that may be multiplexed into the tuned channel. The demultiplexer 201 parses an MPEG transport stream into audio, video, and data streams, and the audio, video, and data buffers 203, 204, and 205 temporarily store the streams, respectively. The MPEG decoder 206 decodes the buffered streams and recovers original signals for output as, for example, an A/V signal, to be combined (mixed) in the signal mixer 207 with an output of the OSD generator 209, which generates an OSD image for enabling user interface.

The system controller 208, in conjunction with the memory 210 for storing various system control data as well as the updated software, controls the broadcast receiver overall. Particularly, the memory 210 stores an operating system (OS) program for driving the broadcast receiver, tuning frequency information, polarization information, symbol rate information, forward-error-correction information, and the like. For example, upon powering on, a broadcast receiver adopting the method of the present invention may execute the stored OS program and read out predetermined tuning information to receive an MPEG transport stream on a designated broadcast channel, so that, in downloading specific software over the air, where a broadcast station or satellite outputs television or other driver software as part of digitally broadcast service information, the broadcast receiver receives, i.e., downloads, the software for installation and updating. That is, rather than a command for downloading software being input by a user via the user interface 211, the software may be downloaded and installed (updated) automatically.

In the operation of a mobile receiver adopting the present invention, a transmitted broadcast signal, including DDB data (e.g., driver software) defined by a specific packet identifier value, is received by the tuner 201. According to the OS program or in response to a download command from a user, the system controller 208 parses the software-associated DDB data by controlling the demultiplexer 202. The MPEG decoder 206 determines whether the parsed DDB data indicates that DDB data corresponding to an unreceived block number was transmitted, and if so, the system controller 208 searches a predetermined set of packet identifier values designated by the broadcaster as carrying the same software. For instance, by comparing the packet identifier values of various transmissions of software A, the system controller 208 may obtain PID information for DDB data corresponding to the unreceived block and thereby determine the corresponding DDB data which is received and correctly decoded earliest among the various transmissions. According to the obtained packet identifier value, any unreceived DDB data may be normally received via a later transmission. The thus-downloaded software, constructed by gathering all blocks of the downloaded DDB data, is stored in the memory 210.

Figure 3:
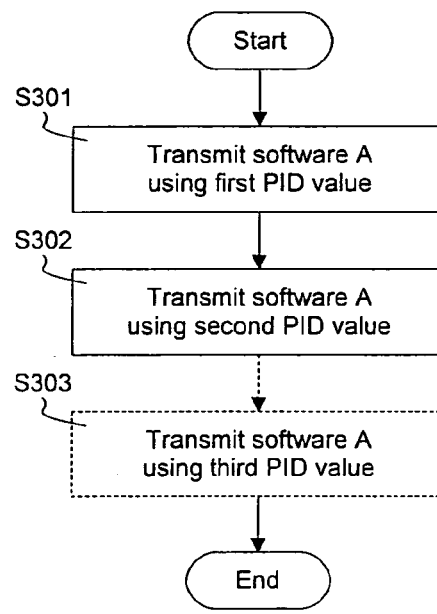
FIG. 3 is a flowchart of a method of transmitting driver software according to the present invention.

Referring to FIG. 3, illustrating the transmitting of divided driver software according to the method of the present invention, software A is first transmitted using a first packet identifier value (S301). That is, specific software to be transmitted is configured as a plurality of download data blocks or DDB data, and all blocks of the first transmission are assigned a specific packet identifier value, for example, PID=1. At the same time, each of the download data blocks of the first transmission is assigned a unique block number, for example, blockNumber 1 through blockNumber N. Thus, every block of the first transmission may be identified at the receiver side according to PID value and block number.

Subsequently, software A is again (separately) transmitted as part of the same TP stream, using a second packet identifier value (S302). Thus, all blocks of the second transmission are also assigned a specific packet identifier value, different from that of the first transmission, for example, PID=2, while each of the download data blocks of the second transmission is correspondingly assigned a unique block number (e.g., 1~N), so that every block of the second transmission may likewise be identified at the receiver side according to PID value and block number.

This separate transmission of the same software is performed so that there is a partial temporal overlap with the first transmission, that is, between the first and second transmissions of software A. The temporal overlap may be achieved by employing a time-shifting delay for the later transmission, where the delay is greater than the first download data block of the first transmission (DDB 1-1) but where the time-shifted transmission occurs before the final download data block of the first transmission (DDB 1-N).

Figure 4:
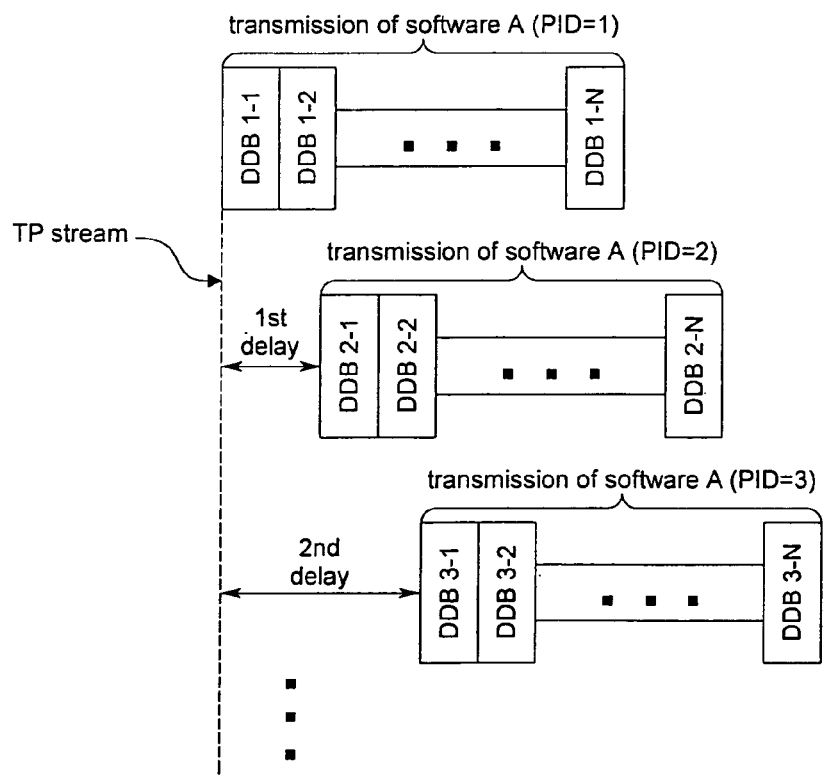
FIG. 4 is a diagram illustrating the driver software transmission method of FIG. 3.

As shown in FIG. 4, this temporal overlap is the same for any number of further transmissions of software A within a single TP stream. In other words, a broadcasting station adopting the method of the present invention sets initial points of DDB data transmission differently for steps S301 and S302, respectively, such that the second transmission of DDB data exhibits a first delay with respect to the first transmission. If further transmissions are employed, the further transmission (e.g., third transmission) of DDB data exhibits a further delay (e.g., a second delay) with respect to the first transmission.

That is, according to another embodiment of the present invention, software A may again be separately transmitted using a third packet identifier value (S303). Provided that any further transmissions of the DDB data of software A exhibits a temporal overlap with respect to the first instance of DDB transmission as well as earlier DDB transmissions, there may be any number of similar subsequent (delayed) transmissions of software A using continuously varying packet identifiers, so that every block of the further transmission is identifiable at the receiver side according to PID value and block number.

Figure 5:
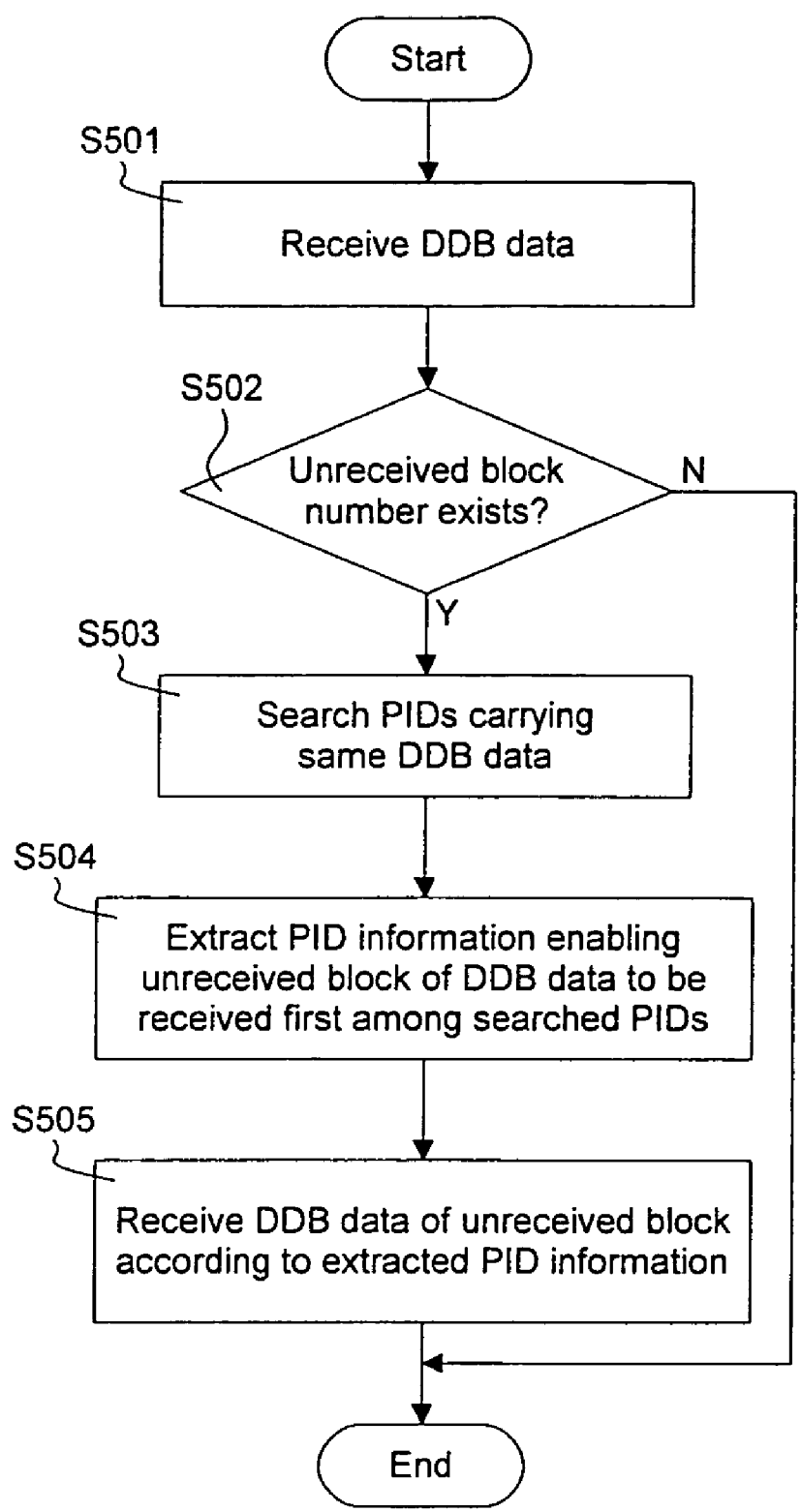
FIG. 5 is a flowchart of a method of receiving driver software transmitted according to the present invention.

FIG. 5 illustrates the receiving of driver software according to the method of the present invention, where the software has been transmitted as in FIG. 3. Here, DDB data configuring specific software (i.e., software A) is received (S501). After a completion of the initial DDB data transmission, it is determined whether DDB data of an unreceived block exists (S502), and if so, packet identifiers carrying equal (corresponding) DDB data are searched (S503). PID information enabling the unreceived block of DDB data to be most preferentially (first) received is extracted from the searched packet identifiers (S504). According to the extracted PID information, the DDB data corresponding to the block number of the unreceived download data block can be parsed at an earliest timing point and stored accordingly (S505).

By adopting the present invention, when transmitting driver software over the air, the same software is transmitted using a plurality of packet identifiers, with each subsequent transmission exhibiting a delay with respect to the initial transmission. Hence, even if one or more blocks of unreceived DDB data exists, the present invention can minimize the time for download completion and thus increase download speeds. In other words, in the course of over-the-air downloading of television or other driver software, if some part of the DDB data is unsuccessfully received or unsuccessfully decoded, the corresponding DDB data is detected and received as early as possible, by transmitting the same software using another packet identifier value and parsing a successfully received download data block corresponding to the unreceived block. That is, by using additional packet identifiers in transmitting the same software, the DDB data of a block number that was not received initially can be more quickly downloaded. Accordingly, the time for downloading driver software can be minimized by preventing unnecessary delays in downloading due to errors that may present in the decoded data at the receiver side, thus facilitating over-the-air downloading of data, e.g., driver software, divided into a plurality of download data blocks at the transmitter side.

It will be apparent to those skilled in the art that various modifications can be made in the present invention without departing from the spirit or scope of the invention. Thus, it is intended that the present invention covers such modifications provided they come within the scope of the appended claims and their equivalents.

What is claimed is:

1. A method of over-the-air transmission of driver software configured as a plurality of download data blocks (DDBs), the method comprising:
   transmitting a first transmission signal including the plurality of DDBs for transmitting the driver software, each DDB of the first transmission signal having a same first packet identifier value; and
   transmitting a second transmission signal that is a distinguishable transmission signal from the first transmission signal, the second transmission signal including a plurality of DDBs, each DDB of the second transmission signal having a same second packet identifier value, wherein each DDB of the second transmission signal corresponds to a respective DDB of the first transmission signal such that the second transmission signal also transmits the driver software, and wherein the transmission of the second transmission signal exhibits a temporal overlap with respect to the transmission of the first transmission signal such that a time delay occurs between a start of the transmission of the first transmission signal and a start of the transmission of the second transmission signal,
   wherein each of the DDBs of the first transmission signal is assigned a block number and each of the DDBs of the second transmission signal is assigned a block number that corresponds to the block number of the respective DDB of the first transmission signal, and every DDB of the first and second transmission signals may be identified at a receiver side according to packet identifier value and block number.

2. The method of claim 1, further comprising:
   transmitting a third transmission signal including a plurality of DDBs that comprise the driver software, each DDB of the third transmission signal having a same third packet identifier value, wherein the transmission of the third transmission signal exhibits a temporal overlap with respect to the transmissions of the first transmission signal and the second transmission signal, and each DDB of the third transmission signal corresponds to a respective DDB of the first transmission signal.

3. The method of claim 2, wherein the transmitting exhibits a temporal overlap with respect to all earlier transmissions of DDB data corresponding to the plurality of DDBs.

4. The method of claim 2, wherein the temporal overlap of the second transmission signal and the third transmission signal is achieved by an increasing time delay with respect to the first transmission signal.

5. The method of claim 4, wherein each increasing time delay for each successive transmission signal is greater than a length of a first DDB included in the first transmission signal and less than a time delay until transmission of a final DDB included in the first transmission signal.

6. The method of claim 1, wherein the second transmission signal temporally overlaps the first transmission signal only in part.

7. The method of claim 1, wherein the temporal overlap is achieved by employing a time-shifting delay for the second transmission signal, wherein the time delay is greater than the first DDB of the first transmission signal, and wherein the time-shifted transmission occurs before transmission of a final DDB of the first transmission signal.

8. A method of over-the-air transmission of driver software configured as a plurality of download data blocks (DDBs), the method comprising:
   transmitting a first transmission signal including the plurality of DDBs for transmitting the driver software, each DDB of the first transmission signal having a same first packet identifier value; and
   transmitting a second transmission signal that is a distinguishable transmission signal from the first transmission signal, the second transmission signal including a plurality of DDBs, each DDB of the second transmission signal having a same second packet identifier value, wherein each DDB of the second transmission signal corresponds to a respective DDB of the first transmission signal such that the second transmission signal also transmits the driver software, and wherein the transmission of the second transmission signal exhibits a time delay with respect to the transmission of the first transmission signal such that a time delay occurs between a start of the transmission of the first transmission signal and a start of the transmission of the second transmission signal,
   wherein each of the DDBs of the first transmission signal is assigned a block number and each of the DDBs of the second transmission signal is assigned a block number corresponding to a block number of a respective DDB of the first transmission signal, and every DDB of the first and second transmission signals may be identified at a receiver side according to packet identifier value and block number.

9. The method of claim 8, wherein the time delay is greater than a first DDB of the first transmission signal and wherein the time-delayed transmission signal occurs before a final DDB of the first transmission signal.

10. A method of over-the-air reception of driver software configured as a plurality of download data blocks (DDBs), the method comprising:
   receiving a first transmission signal including the plurality of DDBs for receiving the driver software, each DDB of the first transmission signal having a same first packet identifier value, wherein each of the DDBs of the first transmission signal is assigned a block number;
   determining, based on the received first transmission signal, whether any DDBs of the first transmission signal is not successfully received;
   searching, when it is determined that at least one DDB of the first transmission signal is not successfully received, a second transmission signal that is a distinguishable transmission signal from the first transmission signal, the second transmission signal including a plurality of DDBs comprising the same driver software as received in the first transmission signal, wherein each DDB of the second transmission signal has a same second packet identifier value, and each DDB of the second transmission signal is assigned a block number corresponding to a block number of a respective DDB of the first transmission signal;
   reading, among the DDBs of the second transmission signal, a DDB of the second transmission signal having the second packet identifier value and a block number corresponding to the block number of the at least one DDB of the first transmission signal not successfully received; and
   receiving the DDB of the second transmission signal having the second packet identifier value and a block number corresponding to the block number of the at least one DDB of the first transmission signal not successfully received.

11. The method of claim 10, wherein the plurality of packet identifier values are predetermined by a broadcaster of the driver software.

12. The method of claim 10, wherein determining whether any DDBs of the first transmission signal is not successfully received is achieved by comparing the packet identifier values of each successive transmission signal of the driver software.

13. A broadcasting system for over-the-air transmission of driver software configured as a plurality of download data blocks (DDBs), the broadcasting system comprising:
   a transmitter for transmitting a first transmission signal including the plurality of DDBs that comprise the driver software, each DDB of the first transmission signal having a same first packet identifier value, and for transmitting a second transmission signal that is a distinguishable transmission signal from the first transmission signal, the second transmission signal including a plurality of DDBs comprising the same driver software as in the first transmission signal, each DDB of the second transmission signal having a same second packet identifier value,
   wherein the transmission of the second transmission signal exhibits a temporal overlap with respect to the first transmission signal such that a time delay occurs between a start of the transmission of the first transmission signal and a start of the transmission of the second transmission signal, and each of the DDBs of the first transmission signal is assigned a block number and each of the DDBs of the second transmission signal is assigned a block number corresponding to a respective block number of a DDB of the first transmission signal, and every block of the first and second transmission signals may be identified at a receiver side according to packet identifier value and block number.

14. The broadcasting system of claim 13, wherein said transmitter further transmits a third transmission signal including a plurality of DDBs, each DDB of the third transmission signal having a same third packet identifier value, and wherein the transmission of the third transmission signal exhibits a temporal overlap with respect to the transmissions of the first transmission signal and the second transmission signal, and each DDB of the third transmission signal corresponds to a respective DDB of the first transmission signal.

15. The broadcasting system of claim 13, wherein the temporal overlap is achieved by employing a time-shifting delay for the second transmission signal, wherein the time delay is greater than the first DDB of the first transmission signal, and wherein the time-shifted transmission occurs before transmission of a final DDB included in the first transmission signal.

16. A broadcast receiver for over-the-air reception of driver software configured as a plurality of download data blocks (DDBs), the broadcast receiver comprising:
 a mobile receiver for receiving a first transmission signal including the plurality of DDBs that comprise the driver software, each DDB of the first transmission signal having a same first packet identifier value, wherein each of the DDBs of the first transmission signal is assigned a block number; and
 a system controller for determining, based on the received first transmission signal, whether any DDBs of the first transmission signal is not successfully received and, when it is determined that at least one DDB of the first transmission signal is not successfully received, searching a second transmission signal that is a distinguishable transmission signal from the first transmission signal, the second transmission signal including a plurality of DDBs comprising the same driver software as received in the first transmission signal, wherein each DDB of the second transmission signal have a same second packet identifier value, and each DDB of the second transmission signal is assigned a block number corresponding to a block number of a respective DDB of the first transmission signal,
 wherein said system controller reads, among the searched DDBs included in the second transmission signal, the DDB included in the second transmission signal that corresponds to the at least one DDB of the first transmission signal that is not successfully received, and said receiver receives the DDB of the second transmission signal having the second packet identifier value and a block number corresponding to the block number of the at least one DDB of the first transmission signal not successfully received.

17. The broadcast receiver of claim 16, further comprising:
 a demultiplexer for parsing the received DDBs; and
 an MPEG decoder for determining whether the parsed DDBs indicates that DDBs corresponding to the at least one DDB of the first transmission signal that is not successfully received was transmitted,
 wherein said system controller determines whether at least one DDB of the first transmission signal was not successfully received by comparing the packet identifier values of each transmission of the driver software.

18. The broadcast receiver of claim 16, wherein the mobile receiver is a digital television and wherein the driver software is television driver software.

* * * * *